Figures 1, 2, 3:
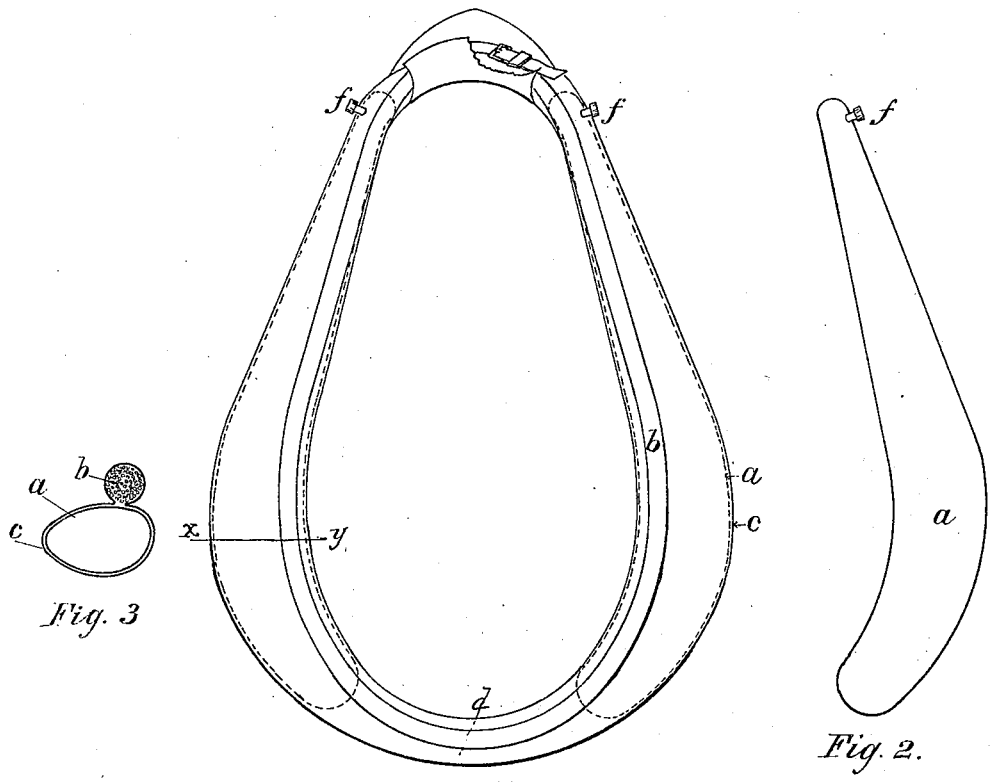

(No Model.)

L. INGELS.
HORSE COLLAR.

No. 511,699. Patented Dec. 26, 1893.

Witnesses.
L. C. Woodman
J. H. McCutcheon

Inventor.
Lauron Ingels

UNITED STATES PATENT OFFICE.

LAURON INGELS, OF SEATTLE, WASHINGTON.

HORSE-COLLAR.

SPECIFICATION forming part of Letters Patent No. 511,699, dated December 26, 1893.

Application filed July 7, 1893. Serial No. 479,810. (No model.)

*To all whom it may concern:*

Be it known that I, LAURON INGELS, a citizen of the United States, residing at Seattle, in the county of King, State of Washington, have invented a new and useful Improvement in Horse-Collars, of which the following, in connection with the accompanying drawings, is a full, clear, and exact description.

My invention relates to horse collars, and has for its object to form a collar in which the after-wale portion instead of being stuffed will be formed of independent inflatable air sacks inclosed within independent pockets capable of limiting the extension of the independent air sacks whereby said sacks can be inflated one to a greater extent than the other when desired to have the after-wale fuller and firmer on one side of the collar than on the other side and so that when from any cause there is greater pressure upon one shoulder of the horse than upon the other the air in the after-wale on one side of the collar will not be forced into the other side of the collar thus causing the after-wale on each side of the collar to conform more readily and perfectly to the two shoulders of the horse and to afford a better distribution of the draft throughout the two shoulders of the horse; and it has also for its object to provide the collar with such stiffness at the throat portion that this feature will tend to keep the collar in shape and to resist the tendency of the collar to twist when the draft is thrown upon the forewale which tendency exists to a detrimental extent when the afterwale has imparted to it a high degree of elasticity resulting from forming the after-wale of air cushions, and which tendency to twist out of shape if not prevented would render the hames liable to change of position and under some conditions to slip from the fore-wale.

To overcome the objections stated and to accomplish the objects mentioned, the invention consists in forming the after-wale proper of the collar of two independent pockets inclosing each an independent inflatable air sack and in separating the two pockets by a division wall made by the throat portion stuffed with material giving to it stiffness and firmness sufficient to hold the collar in place, all as hereinafter more particularly described and then sought to be specifically defined by the claim, reference being had to the accompanying drawings forming a part hereof, and in which—

Figure 1 is a side elevation of a collar made in accordance with my invention. Fig. 2 is a side elevation of an independent inflatable air sack which forms a part of the afterwale; and Fig. 3 is a cross section through one side of the collar.

In the drawings the letter $b$ indicates the fore-wale of the collar stuffed with suitable material to impart to it stiffness, and $c$ designates the two flexible pockets constituting a part of the after-wale of the collar and separated from each other at their lower ends by a division wall made by the throat portion $d$ which is stuffed with suitable material to give to it sufficient stiffness to keep the collar in shape and at the same time having flexibility enough to permit the upper ends of the collar to be separated in the act of placing the collar on the horse and taking it therefrom.

Within each of the pockets $c$ is placed an independent inflatable air sack $a$, which sacks constitute each an essential part of the after-wale proper, and each of the sacks is provided with a tube or nozzle $f$ through which it can be inflated with air. Each sack is limited in its inflation by the pocket $c$ in which it fits and which is preferably formed of leather so as to be flexible. As each sack is inflated it assumes the shape of the pocket in which it fits, and one side of the after-wale may be given greater fullness and firmness by inflating the air sack on that side to a greater extent than the sack on the other side, each sack however having the shape of the pocket in which it fits but one side possessing greater firmness than the other by reason of being inflated to a greater extent. In this way I am enabled to make the after-wale of the collar conform more to the shape of the horse's shoulder so that any difference in the two shoulders is compensated for by the separate inflation of the two air sacks and thus a better collar is obtained. It will also be observed that under this construction if there should be a heavier draft thrown on one side of the collar than on the other, the air will not be forced from one side of the after-wale to the other but will be retained on that side of the afterwale and the strain thus be distributed over the entire shoulder of the horse where the greatest strain comes. In this way the collar is made to fit snugly and comfortably to the horse's shoulder throughout the entire length of each side of the after-wale and the strain instead of being thrown upon any particular part is distributed throughout the entire length of the side of the after-wale on which it comes as should be in an easy fitting and working collar. It will further be observed that the division wall made by the stuffed throat portion will resist the downward pressure of the air in the direction of the length of each air sack, and if either sack should from any cause become broken the air would not escape from it into the other side of the after-wale but would for a greater or less time be retained in the pocket inclosing that sack and thus enable the collar to be used for a period after the breaking of the sack and until another could be provided in place of it, and in repairing the collar it will be necessary to open only one pocket and remove one sack instead of distributing both pockets and an entire length of sack from one end to the other of the collar. It will also be observed that this division wall made by the stuffed throat portion tends to hold the collar in place and to prevent it from twisting to an extent that the hames would change their position or slip from the collar which serious defects and consequences would be liable to occur if the stuffed throat portion were not used and a continuous air sack were run from one end to the other of the collar.

Having described my invention and set forth its merits, what I claim is—

A horse collar having as essentials the forewale and throat portion provided with a suitable stuffing, and its after wale proper formed of independent flexible pockets separated from each other by a division wall made by said stuffed throat portion, and an independent inflatable air sack in each pocket, substantially as and for the purposes described.

LAURON INGELS.

Witnesses:
F. D. McCUTCHEON,
FLORENCE V. SELBY.